(12) United States Patent
Wu (10) Patent No.: US 8,437,079 B2
(45) Date of Patent: May 7, 2013

(54) APPARATUS INCLUDING A RETICLE, ASSEMBLY AND METHOD FOR OPERATING THE SAME

(75) Inventor: Youjin Wu, Westland, MI (US)

(73) Assignee: Leapers, Inc., Livonia, MI (US)

( * ) Notice: Subject to any disclaimer, the term of this patent is extended or adjusted under 35 U.S.C. 154(b) by 26 days.

(21) Appl. No.: 13/102,644

(22) Filed: May 6, 2011

(65) Prior Publication Data
US 2012/0281278 A1    Nov. 8, 2012

(51) Int. Cl.
*G02B 23/00* (2006.01)

(52) U.S. Cl.
USPC ............................... 359/428; 42/123; 42/132

(58) Field of Classification Search .......................... None
See application file for complete search history.

(56) References Cited

U.S. PATENT DOCUMENTS

| | | | |
|---|---|---|---|
| 3,492,733 A * | 2/1970 | Leatherwood | 42/122 |
| 4,142,801 A | 3/1979 | Calder et al. | |
| 6,213,470 B1 | 4/2001 | Miller | |
| 6,611,244 B1 * | 8/2003 | Guritz | 345/46 |
| 2004/0047586 A1 * | 3/2004 | Schick et al. | 385/147 |
| 2011/0199677 A1 * | 8/2011 | Schick et al. | 359/428 |

FOREIGN PATENT DOCUMENTS

| | | |
|---|---|---|
| GB | 2068584 B | 8/1983 |
| JP | 7113960 A | 5/1995 |
| WO | WO-2008045129 | 4/2008 |

OTHER PUBLICATIONS

European Search Report for Application No. 12 16 6044 dated Aug. 10, 2012.

* cited by examiner

*Primary Examiner* — Arnel C Lavarias
(74) *Attorney, Agent, or Firm* — Honigman Miller Schwartz and Cohn LLP (57) ABSTRACT

A scope is disclosed and includes a substantially tubular body having an inner surface and an outer surface. The scope includes a reticle, a light-emitting diode, and a circuit board including a processor having a program. The light-emitting diode is connected to the circuit board and the program controls the light-emitting diode to emit one of at least three user-selectable colored lights upon the reticle.

54 Claims, 8 Drawing Sheets

| M | | LEVEL | | | | | |
|---|---|---|---|---|---|---|---|
| | | L1 | L2 | L3 | L4 | L5 | L6 |
| COLOR | C1 | Magenta | Thistle | Plum | Violet | Orchid | Purple |
| | C2 | Pink | Rosy Brown | Coral | Crimson | Brown | Maroon |
| | C3 | Yellow | Khaki | Orange | Goldenrod | Chocolate | Olive |
| | C4 | Lawn Green | Pale Green | Spring Green | Olive Drab | Sea Green | Forest Green |
| | C5 | Cyan | Azure | Turquoise | Cadet Blue | Dark Cyan | Teal |
| | C6 | Blue | Sky Blue | Dodger Blue | Indigo | Midnight Blue | Navy |

APPARATUS INCLUDING A RETICLE, ASSEMBLY AND METHOD FOR OPERATING THE SAME

TECHNICAL FIELD

The disclosure relates to an apparatus including a reticle, assembly and method for operating the same.

BACKGROUND

It is known to dispose a scope upon a firearm. Improvements to scopes are continuously being sought in order to advance the art.

DESCRIPTION OF THE DRAWINGS

The disclosure will now be described, by way of example, with reference to the accompanying drawings, in which.

DETAILED DESCRIPTION

The figures illustrate an exemplary implementation of an apparatus including a reticle, assembly and method for operating the same. Based on the foregoing, it is to be generally understood that the nomenclature used herein is simply for convenience and the terms used to describe the invention should be given the broadest meaning by one of ordinary skill in the art.

Figure 1:
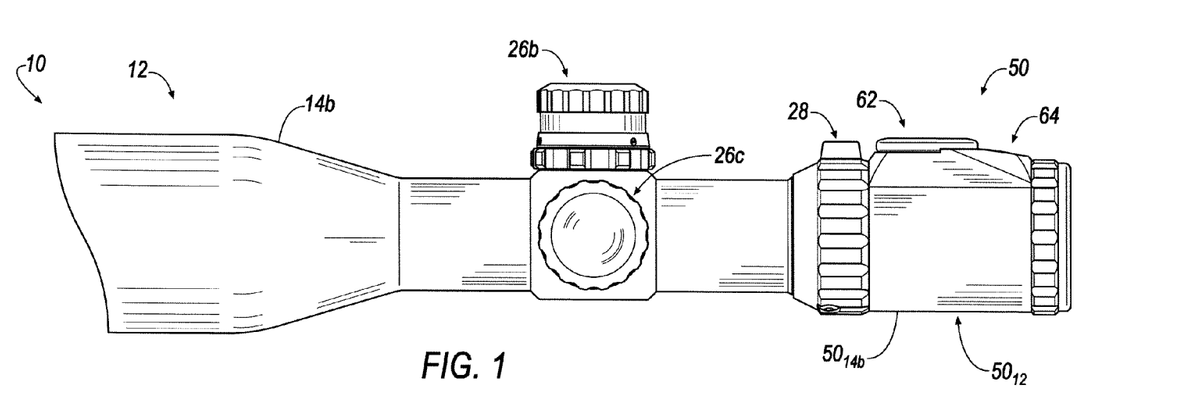
FIG. 1 is a side view of an exemplary scope.
Figure 2:
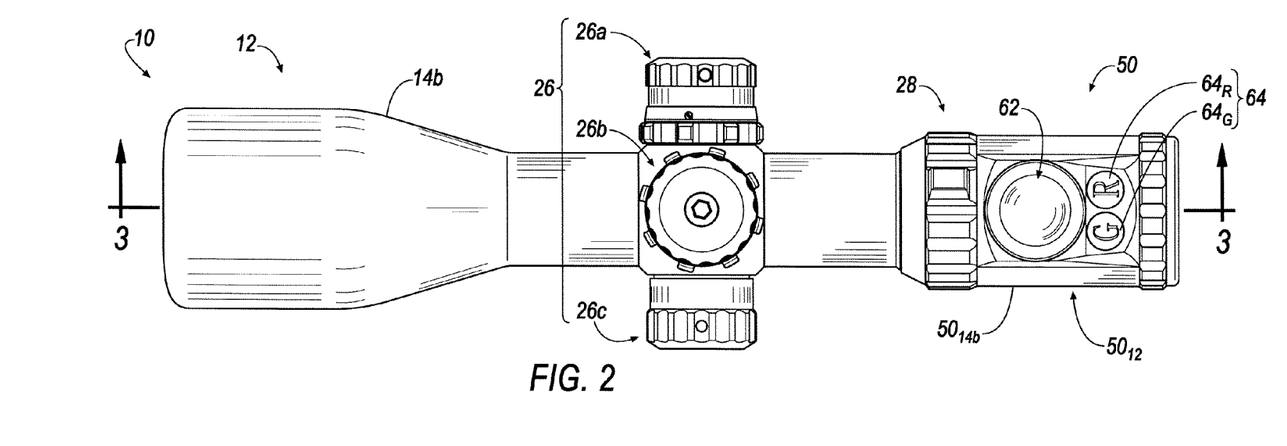
FIG. 2 is a top view of the exemplary scope of FIG. 1.
Figure 3:
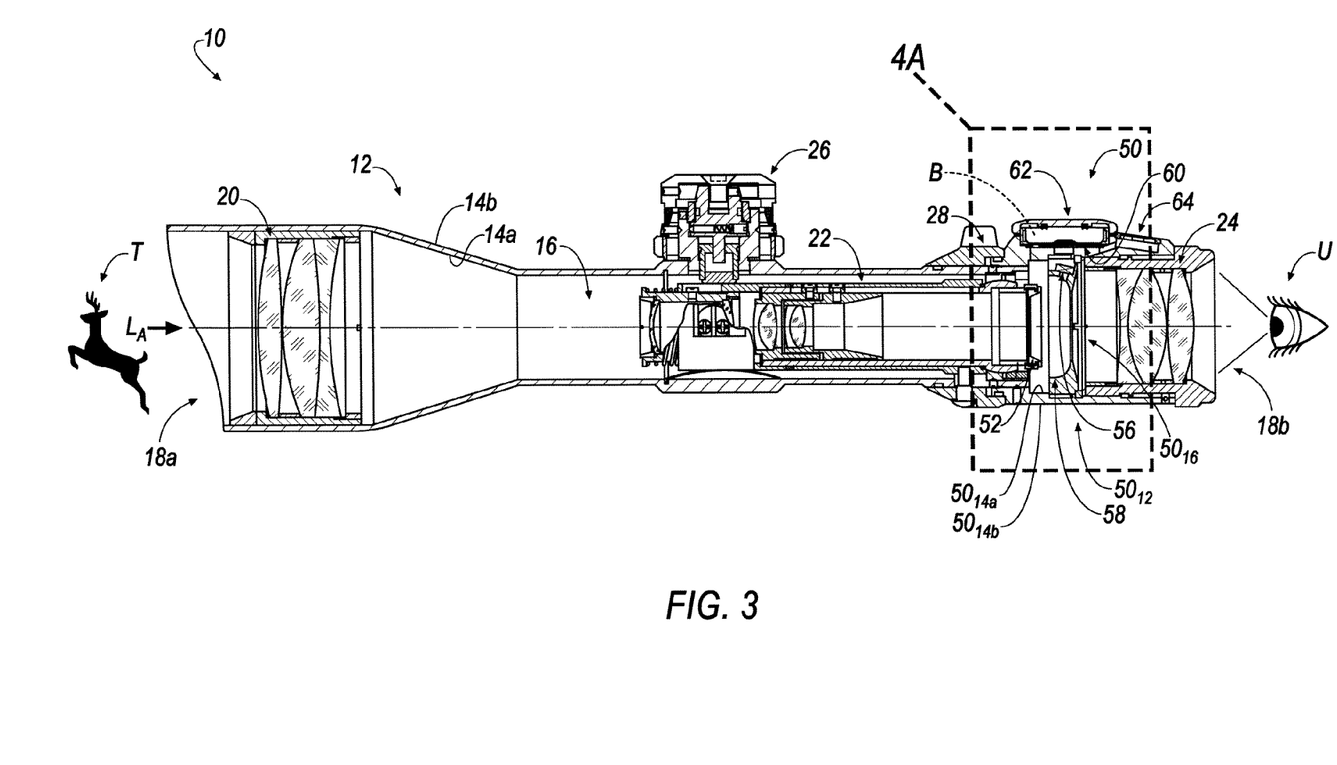
FIG. 3 is a cross-sectional view of the scope according to line 3-3 of FIG. 2.

FIGS. 1-3 illustrate an exemplary scope shown generally at 10. Referring to FIG. 3, the scope 10 includes a tube 12 having an inner surface 14a and an outer surface 14b. The inner surface 14a may form a passageway 16 extending through the tube 12. Ambient light, $L_A$, may be permitted to enter through an opening and into the passageway 16 at a distal end 18a of the scope 10 such that a user, U, is permitted to see a target, T (see, e.g., FIGS. 3, 5A-5D), at a proximal end 18b of the scope 10.

Figure 4A:
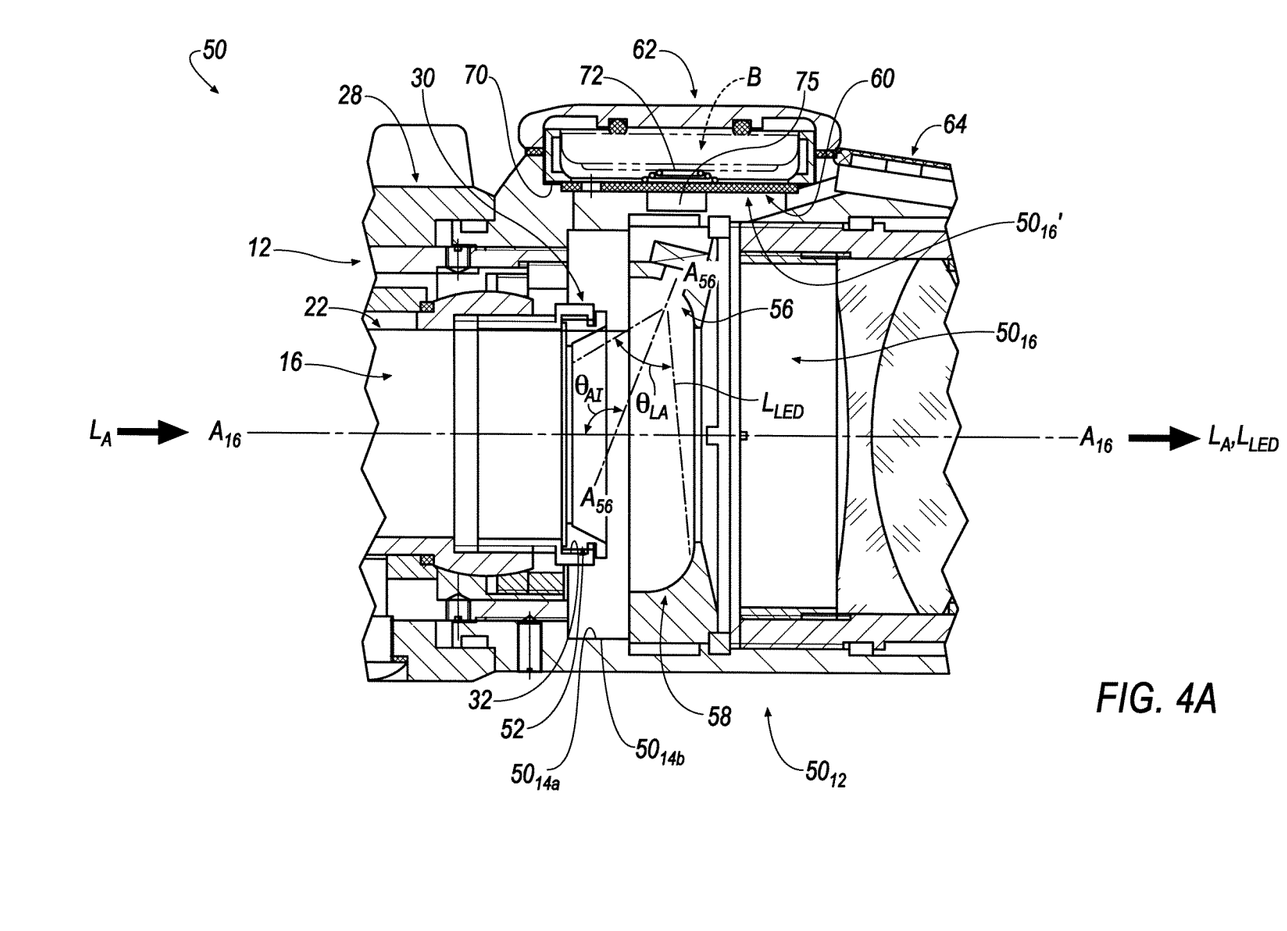
FIG. 4A is an enlarged view according to line 4A of FIG. 3 illustrating an exemplary assembly.
Figure 4B:
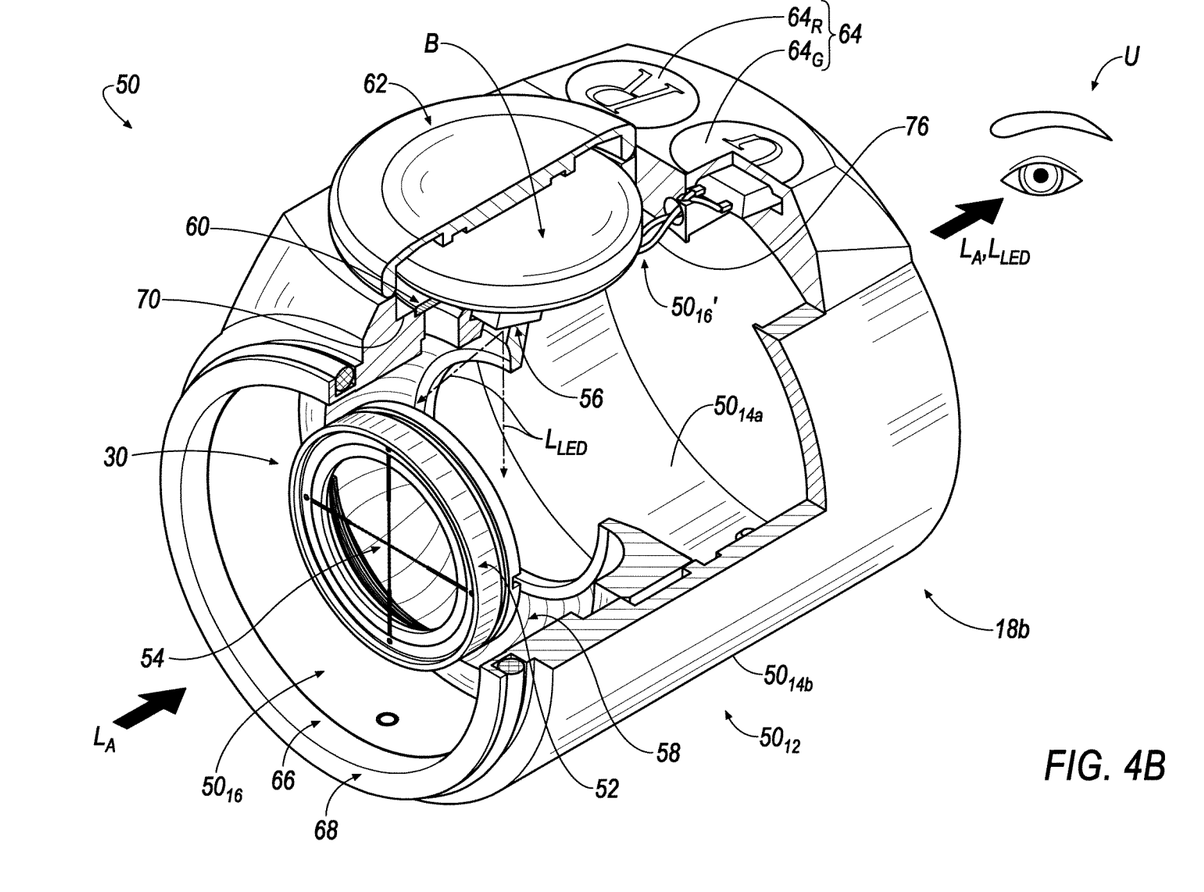
FIG. 4B is a partial perspective, cutaway cross-sectional view of the assembly of FIG. 4A.

The proximal end 18b of the scope 10 may include a substantially tubular body $50_{12}$ (see also, e.g., FIGS. 4A-4B). Although a separate component with respect to the tube 12, the substantially tubular body $50_{12}$ may include a passageway $50_{16}$ that is in communication with, and may form a portion of the passageway 16 extending through the scope 10. Further, upon connecting the substantially tubular body $50_{12}$ to the tube 12, the substantially tubular body $50_{12}$ may also be said to include an inner surface $50_{14a}$ and an outer surface $50_{14b}$ that may, respectively, be in communication with and form part of the inner surface 14a and the outer surface 14b of the tube 12.

With continued reference to FIG. 3, one or more components 20-24 may be disposed within the passageway 16, $50_{16}$. The one or more components 20-24 disposed within the passageway 16, $50_{16}$ may include, for example: an object piece 20, an erector tube 22 and an eye piece 24. Further, a portion of an outer surface of each of the object piece 20, erector tube 22 and eyepiece 24 may be connected to the inner surface 14a, $50_{14a}$ of the tube 12 and/or substantially tubular body $50_{12}$. In an embodiment, the substantially tubular body $50_{12}$ may be referred to as an "eye piece housing" that supportably-retains the eye piece 24 within the passageway $50_{16}$.

Referring to FIGS. 1-3, one or more components 26-28 may be arranged upon the outer surface 14b of the tube 12. The one or more components 26-28 arranged upon the outer surface 14b of the tube 12 may include, for example: a plurality of adjustment knobs 26 and a power ring 28. The plurality of adjustment knobs 26 include a windage knob 26a, an elevation knob 26b, and a side parallex adjustment knob 26c.

The one or more components 26-28 arranged upon the outer surface 14b of the tube 12 may be in communication with the one or more of the components 20-24 disposed within the passageway 16, $50_{16}$. The user, U, may directly touch/contact/interface with the one or more components 26-28 arranged upon the outer surface 14b of the tube 12 for selectively adjusting/manipulating one or more of the components 20-24 disposed within the passageway 16, $50_{16}$; accordingly, the user, U, may selectively tune or adjust the scope 10, as desired.

With continued reference to FIGS. 1-3, and, to FIGS. 4A-4B, an assembly is shown generally at 50. The assembly 50 includes the substantially tubular body $50_{12}$. A first portion of the assembly 50 may be said to be disposed within the passageway $50_{16}$ formed by the inner surface $50_{14a}$. A second portion of the assembly 50 may be said to be arranged upon the outer surface $50_{14b}$ of the substantially tubular body $50_{12}$.

Referring to FIGS. 4A-4B, an exemplary implementation of the first portion and the second portion of the assembly 50 may include one or more components 52-64. The first portion of the assembly 50 may include one or more components 52-60 disposed within the passageway $50_{16}$ and connected directly or indirectly to one or more of the inner surface $50_{14a}$. The one or more components 52-60 may include, for example: a reticle-including member 52, a reticle 54 (see, e.g., FIGS. 4B and 5A-5D), a light emitting diode (LED) 56, an LED light reflector 58 and a circuit board 60. The second portion of the assembly 50 may include one or more components 62-64 arranged upon the outer surface $50_{14b}$ of the substantially tubular body $50_{12}$ and may include, for example: a cap member 62 and a pair of push buttons 64 including a first push button $64_R$ (see also, e.g., FIG. 2) and a second push button $64_G$ (see also, e.g., FIG. 2).

Referring to FIG. 4A, the reticle-including member 52 may be connected to and be carried by a proximal end 30 of the erector tube 22; because an outer surface of the erector tube 22 may be connected to the inner surface 14a of the tube 12, the reticle-including member 52 may be said to be indirectly connected to the inner surface $50_{14a}$ of the substantially tubular body $50_{12}$. In an implementation, the proximal end 30 of the erector tube 22 may be referred to as a "reticle housing" that forms a pocket 32 or registration portion that permits the reticle-including member 52 to be connected to and be carried by the proximal end 30 of the erector tube 22.

Referring to FIG. 4B, the proximal end 30 of the erector tube 22 may be disposed within an opening 66 formed in a distal end 68 of the substantially tubular body $50_{12}$. Accordingly, although the reticle-including member 52 may be connected to the erector tube 22, the arrangement of the reticle-including member 52 within the passageway $50_{16}$ of the substantially tubular body $50_{12}$ at the opening 66 may permit the reticle-including member 52 to be included as a component of the assembly 50.

In an implementation, the reticle-including member 52 may be substantially transparent and permit passageway of the ambient light, $L_A$, that enters into the tube 12 from the distal end 18a of the scope 10 to pass through the reticle-including member 52 and toward the proximal end 18b of the scope 10. Subsequently, the ambient light, $L_A$, may pass through the eye piece 24 such that a user, U, may be able to see the ambient light, $L_A$; typically, the ambient light, $L_A$, is reflected off of an object, such as the target, T.

Although, in an implementation, the reticle-including member 52 may be said to be substantially transparent, a portion of the reticle-including member 52 may appear to be opaque. The portion of the reticle-including member 52 that may appear to be opaque may be the location of the reticle 54. As will be described in the following disclosure, the quality of the reticle 54 permits LED light, $L_{LED}$, originating from the LED 56 to be reflected toward the proximal end 18b of the scope 10 and through the eye piece 24 such that the user, U, may see and differentiate the reticle 54, which appears to be illuminated with a user-selectable color of LED light, $L_{LED}$, from the ambient light, $L_A$.

The reticle 54 may be provided upon the reticle-including member 52 by way of any desirable implementation. In an implementation, if, for example, the reticle-including member 52 is derived from glass, and, the glass is etched (by utilizing any desirable glass etching methodology), the reticle 54 may be emissive and integrally-formed with/upon a surface of the reticle-including member 52. Alternatively, another implementation may include the reticle 54 being formed from a separate, reflective component (e.g., a reflective, etched-metal body) that is applied to or otherwise joined to a surface of a non-etched, glass member 52.

Although an above-described embodiment includes a glass member 52 that is (1) etched, or, (2) an etched body attached to a non-etched glass member 52, the reticle 54 is not limited to being formed with or applied to the member 52 as described above. For example, an embodiment of the assembly 50 may not include the glass member 52, but, rather, only a reflective, etched-metal body 54 disposed within the pocket 32. Accordingly, the reticle 54 may be formed without ever being formed with or applied to another member, such as, for example, a substantially transparent member 52.

With reference to FIGS. 4A-4B, the inner surface $50_{14a}$, of the substantially tubular body $50_{12}$ may form a second passageway $50_{16}'$ that is in communication with and substantially perpendicularly arranged with respect to the passageway $50_{16}$, which may be hereinafter referred to as the "first passage." The inner surface $50_{14a}$, forming the second passageway $50_{16}'$ may form a bezel 70 within second passageway $50_{16}'$. The bezel 70 provides a surface that supports the circuit board 60. The LED 56 may be operatively-connected to the circuit board 60 and be arranged substantially within one or both of the first and second passageways $50_{16}$, $50_{16}'$.

In addition to supporting the circuit board 60, the bezel 70 may also be sized to accommodate receipt of a battery, B. Upon being connected to the circuit board 60, the battery, B, may also be located within the second passageway $50_{16}'$.

In an implementation, the battery, B, may be arranged substantially adjacent to and supported by the circuit board 60 such that the battery, B, may be said to be in electrical communication with an electrode 72 (see, e.g., FIGS. 4A, 7-8) extending from the circuit board 60. The battery, B, may provide power to the circuit board 60 as well as other components, such as the LED 56 and a controller 75 (see, e.g., FIGS. 4A, 7-8) connected to the circuit board 60. The cap 62 may be removed in order to provide access to the second passageway $50_{16}'$ in order to, for example, replace or service one or more of the battery, B, and the circuit board 60.

In an implementation, power may be provided to the LED 56 by way of one or more leads 74 (see, e.g., FIGS. 7-8) connecting the LED 56 to the circuit board 60. A capacitor, C (see, e.g., FIG. 8), may be connected to the circuit board 60 in order to protect the controller 75 from a temporary battery disconnection resulting from, e.g., heavy recoil of a firearm (not shown) that supports the scope 10. A resistor, R (see, e.g., FIG. 8), may be connected to the circuit board 60 in order to regulate current to the red output portion of the LED 56 because, typically, the operation voltage of the red LED channel is lower than that of the green and blue channels.

Referring to FIG. 4A, the LED 56 may be arranged relative to the reticle 54 within the passages $50_{16}$, $50_{16}'$ at an angle, $\theta_{AI}$, which may be subsequently identified as an "angle of incidence." The angle of incidence, $\theta_{AI}$, may be referenced from a first axis, $A_{16}$-$A_{16}$, extending through an axial center of the passageways 16, $50_{16}$ and a second axis, $A_{56}$-$A_{56}$, extending through an axial center of the LED 56.

With continued reference to FIG. 4A, the LED 56 may be further characterized by a lighting angle, $\theta_{LA}$. The lighting angle lighting angle, $\theta_{LA}$, may be dependent upon a design characteristic of a particular LED 56 that may be selected by the designer/manufacturer of the assembly 50. In an embodiment, if, for example, the LED includes a lighting angle, $\theta_{LA}$, approximately equal to 120°, the LED 56 may be limited to shedding LED light, $L_{LED}$, in 60° in either direction relative to the axis, $A_{56}$-$A_{56}$, extending through the axial center of the LED 56.

Similarly, with respect to the connection of the LED 56 and the circuit board 60, the first push button $64_R$ and the second push button $64_G$ are also operatively-connected to the circuit board 60. One or more leads 76 (see, e.g., FIGS. 4B, 7-8) extending from each of the first push button $64_R$ and the second push button $64_G$ may be connected to the circuit board 60 in any desirable fashion (e.g., by way of a hardwired connection or by way of wireless connection).

Figure 7:
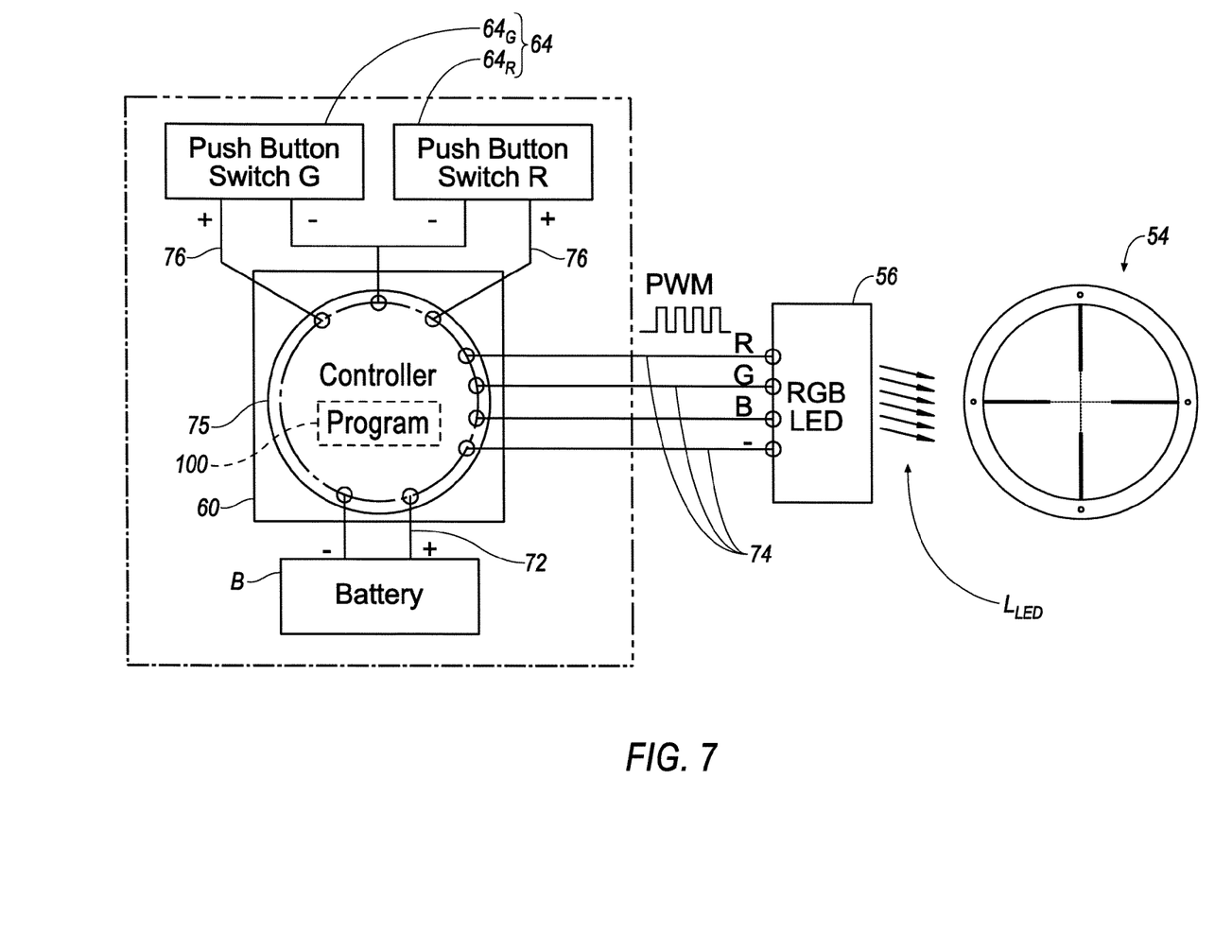
FIG. 7 is a block diagram of an exemplary circuit associated with the assembly of FIGS. 4A-4B.

Referring to FIG. 7, upon being depressed by, for example, the user, U, one or more of the first push button $64_R$ and the second push button $64_G$ operatively provide an "input" to the controller 75 disposed upon the circuit board 60. Further, it may be said that the LED 56 operatively provides an "output" (in the form of, e.g., LED light, $L_{LED}$) in response to, for example, the depression of one or more of the first push button $64_R$ and the second push button $64_G$ by the user, U. In the event that power is no longer provided to the circuit board 60 (e.g., if the user, U, manually "turns off" the assembly 50, or, if, for example, the assembly 50 automatically "shuts off," or, if, for example, an amount of remaining charge stored by the battery, B, is depleted), the LED 56 may be said to no longer provide an output in the form of LED light, $L_{LED}$.

Referring to FIG. 4B, in the event that the LED 56 provides an output in the form of LED light, $L_{LED}$, the angle of incidence, $\theta_{AI}$, results in the LED light, $L_{LED}$, being initially directed substantially toward the distal end 18a of the scope 10 such that the LED light, $L_{LED}$, is incident upon the reticle 54. The reticle 54 then reflects/re-directs the LED light, $L_{LED}$, toward the proximal end 18b of the scope such that the LED light, $L_{LED}$, passes through the eye piece 24 in order to be received at a user's eye. A user, U, looking into the first passageway $50_{16}$ at the proximal end $18b$ of the scope 10 may therefore see the reflected LED light, $L_{LED}$, from the reticle 54; in other words, the reticle 54 may be said to be "illuminated" by way of the LED light, $L_{LED}$, originating from the LED 56.

With continued reference to FIGS. 4A-4B, the inner surface $50_{14a}$ of the substantially tubular body $50_{12}$ may further define or form part of an LED light reflector 58. In an alternative embodiment, the LED reflector 58 may be formed as a separate component that is attached to the inner surface $50_{14a}$ of the substantially tubular body $50_{12}$.

The LED light reflector 58 may assist in the operation of the assembly 50 in instances when, for example, the lighting angle, $\theta_{LA}$, of the LED 56 is wide enough such that a portion of the LED light, $L_{LED}$, is not directly incident upon the reticle 54. Accordingly, the LED light reflector 58 may function by re-directing the LED light, $L_{LED}$, that is not otherwise directly communicated toward the reticle 54; thus, the LED light reflector 58 reduces or eliminates the likelihood of the LED light, $L_{LED}$, being firstly propagated toward the user, U, without having been directed toward the reticle 54.

Figure 5A:
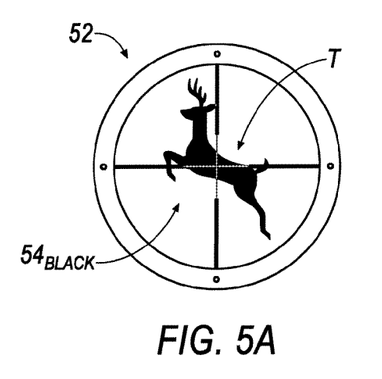
FIGS. 5A-5D illustrate views of an exemplary reticle associated with the assembly of FIGS. 4A-4B.

Referring to FIGS. 5A-5D, the reticle 54 is shown in various states of illumination; accordingly, in an embodiment, the reticle 54 includes the following reference signs: $54_{BLACK}$, $54_{RED}$, $54_{GREEN}$, $54_{MULTI}$. Referring initially to FIG. 5A, the LED 56 is not turned on, and, as a result, the reticle $54_{BLACK}$ is said to be without illumination; as a result, the reticle $54_{BLACK}$ appears to be characterized as having a "black color" to the user, U.

Figure 5B:
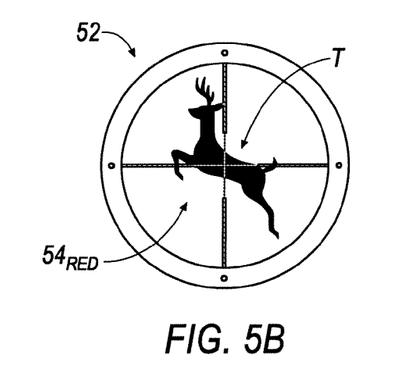

Referring to FIG. 5B, the LED 56 is turned on, and, the user, U, has elected to cause the LED 56 to emit a red light; as a result, the reticle $54_{RED}$ is said to be illuminated with a "first type of color" (e.g. a "pure red color").

Figure 5C:
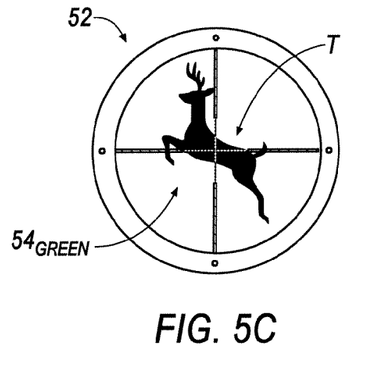

Referring to FIG. 5C, the LED 56 is turned on, and, the user, U, has elected to cause the LED 56 to emit a green light; as a result, the reticle $54_{GREEN}$ is said to be illuminated with a "second type of color" (e.g. a "pure green color").

Figure 5D:
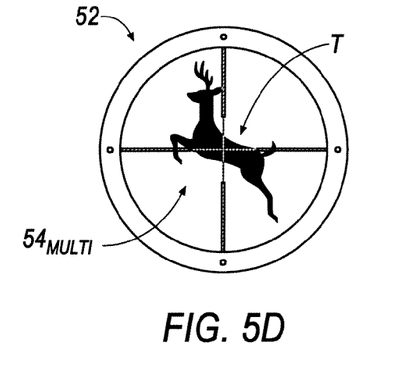

Referring to FIG. 5D, the LED 56 is turned on, and, the user, U, has elected to cause the LED 56 to emit a "third type of color" (e.g. a "blended color" that may include, for example, one or more of a selected intensity/brightness of: a pure red color, a pure green color and a pure blue color). As a result, the reticle $54_{MULTI}$ is not limited to, for example, a red or green color, but, may be selectively tuned to any desirable color.

Figure 8:
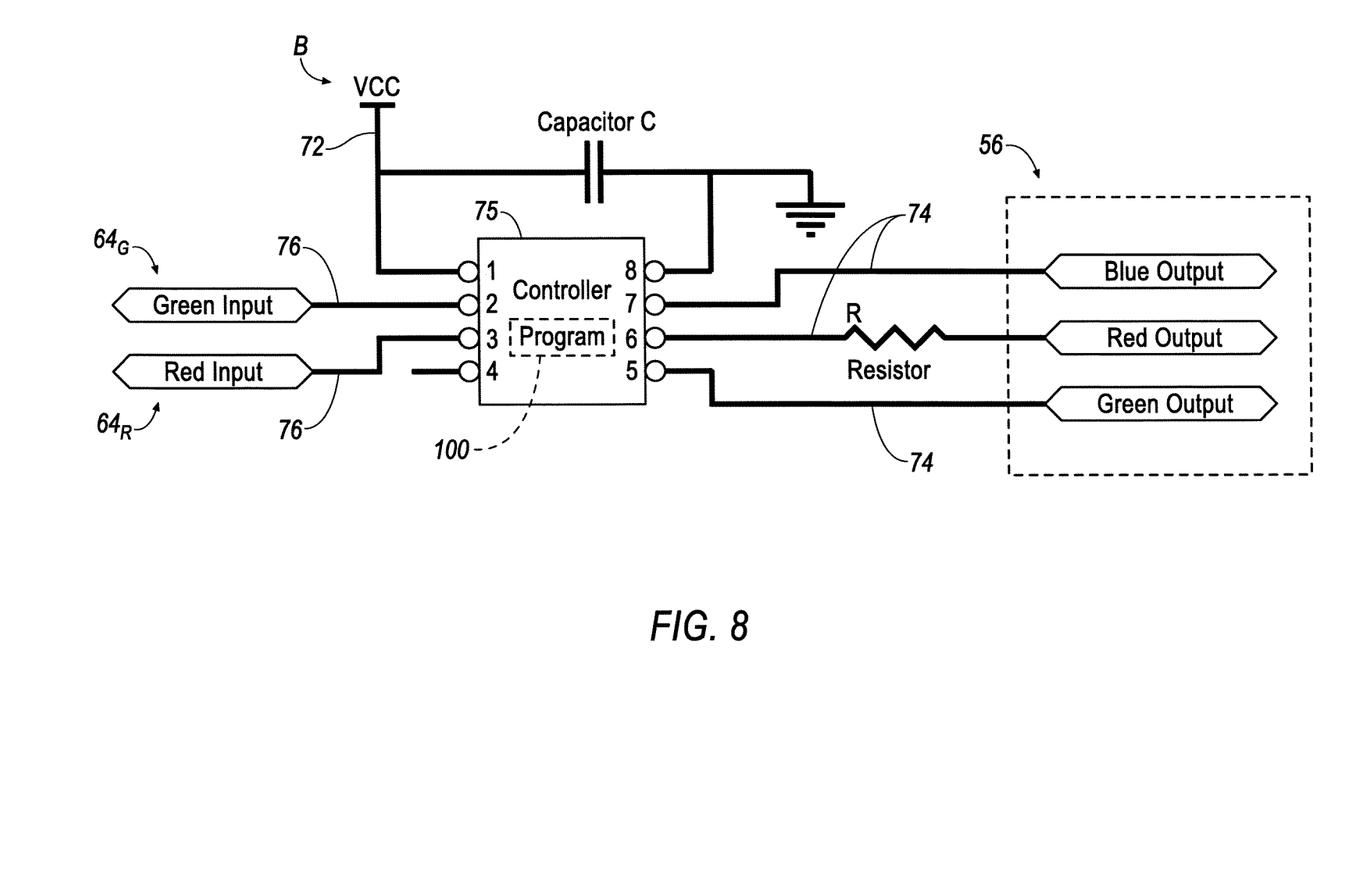
FIG. 8 is a circuit diagram related to the exemplary circuit block diagram of FIG. 7.

The apparent color of the reticle 54 arises from a design characteristic of the LED 56. For example, as seen in FIG. 8, the LED 56 may include a single package (e.g. a single lens/case) including: (1) a pure red light source, (2) a pure green light source and (3) a pure blue light source. Alternatively, the LED 56 may include individual red, green and blue LEDs.

Referring to FIGS. 7-8, the controller 75 may include a program/programming logic 100 (see also, e.g., FIG. 9) that permits user selection of a particular color LED light, $L_{LED}$, and, as a result, the apparent color of the reticle 54. Accordingly, the assembly 50 permits the user, U, to selectively switch to a particular "color mode of operation" at any time.

For example, the illuminated, reticles $54_{RED}$, $54_{GREEN}$ of FIGS. 5B, 5C, may be said to be illuminated during a "first mode of operation" of the logic 100. The first mode of operation may be referred to as a "dual color mode" such that the reticle $54_{RED}$, $54_{GREEN}$ appears to be illuminated with a pure red color (see, e.g., FIG. 5B) or a pure green color (see, e.g., FIG. 5C). Further, for example, regarding the illuminated reticle $54_{MULTI}$ of FIG. 5D, a "second mode of operation" of the logic 100 may be referred to as a "multi-color mode" such that the reticle $54_{MULTI}$ of FIG. 5D appears to be illuminated with a user-selectable, non-pure red/non-pure green color (see, e.g., user-selectable colors of color map, M, shown in FIG. 6).

Figure 9:
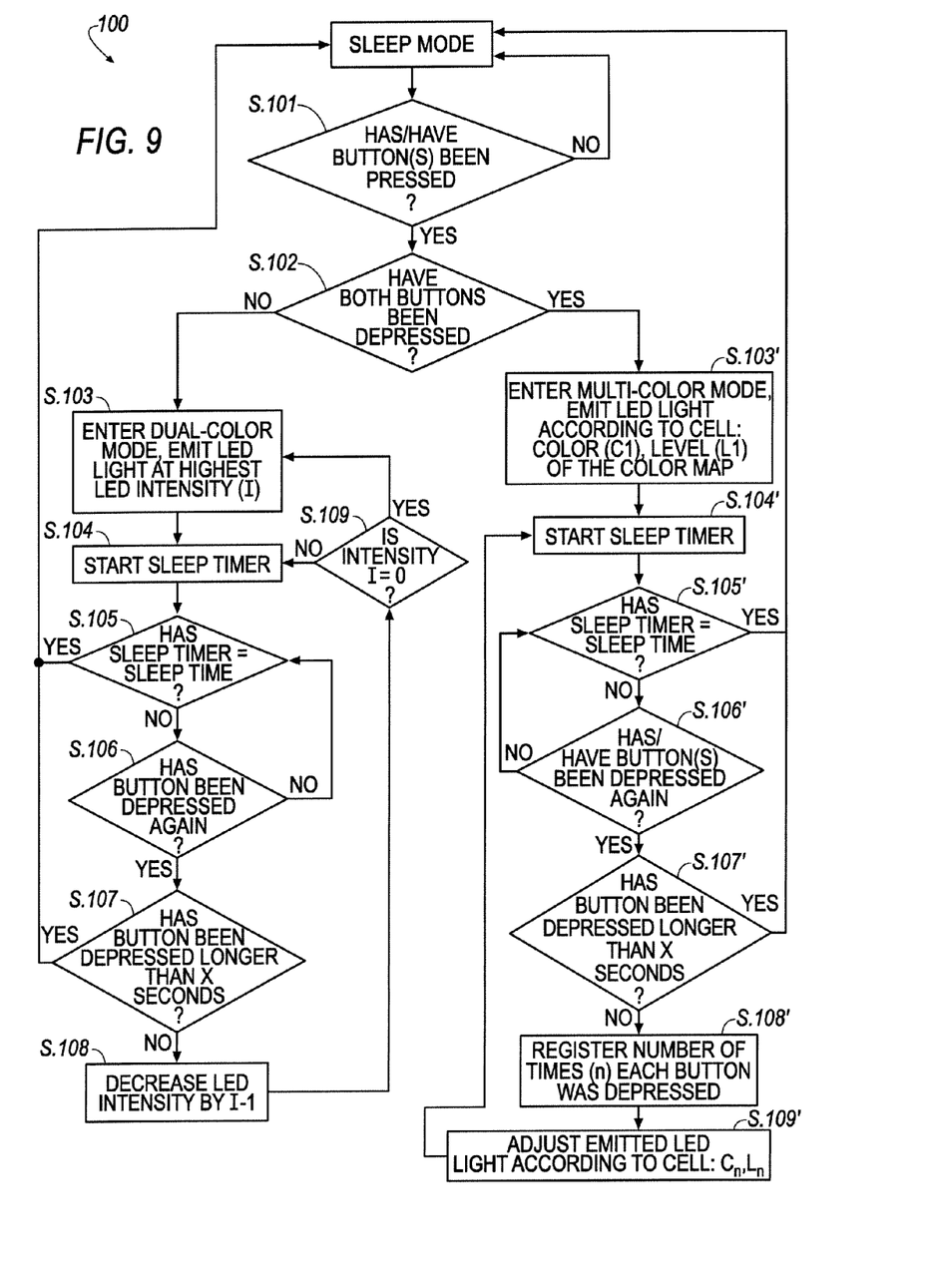
FIG. 9 is a logic flow diagram illustrating an exemplary method for operating the assembly of FIGS. 4A-4B.

Referring to FIG. 9, the first or second mode of operation selected by the user, U, may be dependent upon: (1) a length of time one or more of the first push button $64_R$ and the second push button $64_G$ is/are pushed (see, e.g., step S.101), and/or (2) which of the first push button $64_R$ and the second push button $64_G$ is pushed (see, e.g., steps S.102 to S.103) and/or (3) the simultaneous pushing of the first push button $64_R$ and the second push button $64_G$ (see, e.g., steps S.102 to S.103'). Accordingly, at steps S.101, S.102, the assembly 50 is firstly actuated by depressing one of the first push button $64_R$ and the second push button $64_G$, or, by simultaneously pushing both of the first push button $64_R$ and the second push button $64_G$ for a period of time, X (e.g., one second). If, for example, only the first push button $64_R$ was depressed, the assembly 50 will operate in the "dual color mode" (see step, S.103) and actuate only a pure red LED component of the LED 56; conversely, if, for example, only the second push button $64_G$ was depressed, the assembly 50 will operate in the "dual color mode" (see step, S.103) and actuate only a pure green LED component of the LED 56. Alternatively, if, for example both of the first push button $64_R$ and the second push button $64_G$ are pushed, the assembly 50 will operate in the "multi-color mode" (see step, S.103') and actuate one or more of an intensity/brightness of the pure red, pure green and pure blue LED components of the LED 56.

When set to the "dual color mode," the logic 100 may monitor subsequent depressions of one or more of the first push button $64_R$ and the second push button $64_G$. If, for example, the user, U, does not subsequently depress either of the first push button $64_R$ and the second push button $64_G$ for a period of time (e.g., one hour), the logic 100 may automatically go into "sleep mode" and turn off the LED 56 (see steps, S.104, S.105, S.106). However, if, for example, the user, U, had originally depressed the first push button $64_R$ at step S.101 for the period of time, X, and, at step S.107, again depresses the first push button $64_R$ longer than the period of time, X, the user, U, may manually place the assembly 50 in "sleep mode" by manually turning off the LED 56.

However, at step, S.107, if, for example, the user, U, again depresses the first push button $64_R$ but not longer than the period of time, X, the user, U, may manually decrease the intensity, I, of the LED 56 (see step, S.108). The intensity, I, may be successively lowered at step S.108 to a lower intensity level by repeatedly depressing the first push button $64_R$; however, upon reaching a lowest intensity level (e.g., I=1), if, for example, the user, U, again depresses the first push button $64_R$, the logic 100 will wrap the intensity, I, back to the highest intensity level (see steps, S.109 to S.103).

While in the "pure red" dual color mode as described above, the user, U, may switch to either the "pure green" dual color mode or the multi-color mode at any given time. For example, to switch to the "pure green" dual color mode, the user, U, merely has to depress the second push button $64_G$ shorter than the period of time, X (e.g., one second); alternatively, for example, to switch to the multi-color mode, the user, U, merely has to simultaneously depress both of the first push button $64_R$ and the second push button $64_G$ shorter than the period of time, X (e.g., one second). Accordingly, at any time during an actuation period of the assembly 50, steps S.101, S.102 will continuously monitor if the user, U, desires to leave a currently-selected mode of operation for a different, non-currently selected mode of operation. Thus, in an implementation, the controller 75 may behave as a shift register.

Like the "dual color mode," when logic 100 is set to the "multi-color mode" at step S.103', the logic 100 may monitor subsequent depressions of each of the first push button 64$_R$ and the second push button 64$_G$. If, for example, the user, U, does not subsequently depress either of the first push button 64$_R$ and the second push button 64$_G$ for a period of time (e.g., one hour), the logic 100 may automatically go into "sleep mode" and turn off the LED 56 (see steps, S.104', S.105', S.106'). However, if, for example, the user, U, had originally depressed both of the first push button 64$_R$ and the second push button 64$_G$ at step S.101 for the period of time, X, and, at step S.107', again depresses either the first push button 64$_R$ or the second push button 64$_G$ longer than the period of time, X, the user, U, may manually place the assembly 50 in "sleep mode" by manually turning off the LED 56.

However, at step, S.107', if, for example, the user, U, again depresses either of the first push button 64$_R$ and the second push button 64$_G$ but not longer than the period of time, X, the logic 100 changes light color according to which button was depressed such that the user, U, may manually navigate the color map, M (see FIG. 6), in order to arrive at a desired color output of the LED 56. The color map, M, may relate to a program that was previously stored in the controller 75; accordingly, for a particular number of depressions of the first push button 64$_R$ and the second push button 64$_G$, the controller 75 (by looking to the program) will drive/control an output of each of the red, green and blue components of the LED 56 in order to output a non-pure red/non-pure green, user-selected LED light, L$_{LED}$, emitted from the LED 56.

Figure 6:
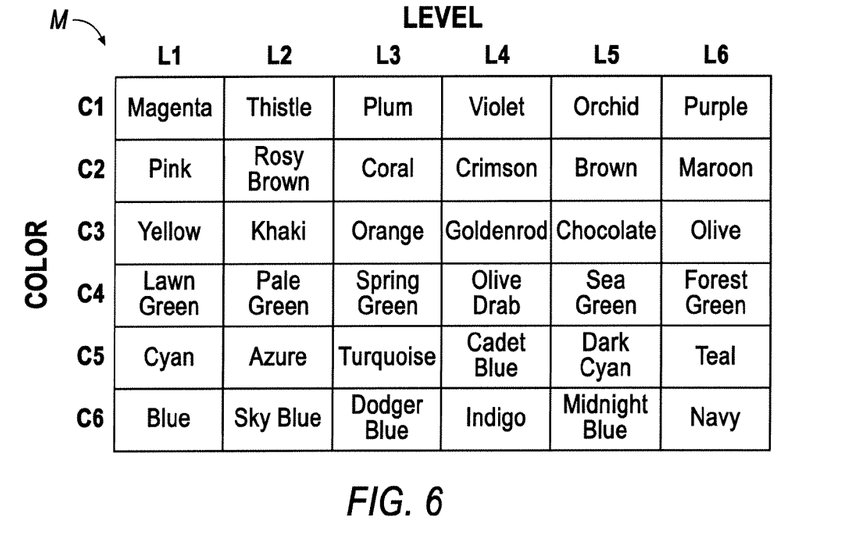
FIG. 6 is an exemplary color map including a plurality of user-selectable colors for illuminating the reticle associated with the assembly of FIGS. 4A-4B.

In an implementation, the color program stored in the controller 75 may perform in a manner that results in, for example, a manipulation of an intensity level of each of the red, green and blue component color channels of the LED 56. In an implementation, the program may be set control a range of an intensity value ranging between approximately about a value of 0 and 255; accordingly, if desired, the program could control the three color channels of the LED 56 in a manner to generate up to 16.8 million (i.e., 256×256×256) colors. In an implementation, the program may cause the controller 75 to drive the intensity of each color channel using any desirable methodology, such as, for example, a pulse width modulation (PWM) methodology; further, the program may cause the controller 75 to drive brightness of the LED 56 by controlling, for example, a duty ratio. Although the program may permit the assembly 50 to provide up to 16.8 million different reticle colors, 54$_{MULTI}$, an embodiment of the program may be narrowed such that the color map, M, may include, for example, a selection of 36 different colors; accordingly, although 36 colors are shown in the color map, M, it will be appreciated that, if desired, the program could result in the color map, M, providing 16.8 million user-selectable colors.

Initially, at step S.103', when set in the multi-color mode, the LED 56 emits a color light, L$_{LED}$, that corresponds to, for example, a color identified at an "origin cell," (C1, L1) of the color map, M; accordingly subsequent depressions of one or more of the first push button 64$_R$ and the second push button 64$_G$ may result in program causing an incremental adjustment of the output color of the LED 56 that corresponds to a color of a different cell, e.g., (Cn, Ln) other than the origin cell (see steps S.108', S.109'). Referring to the color map, M, of FIG. 6, if, for example, the user, U, depressed the first push button 64$_R$ two times and the second push button 64$_G$ three times, at step S.108', the logic 100/program in the processor 75 would determine that the emitted color light, L$_{LED}$, of the LED 56 should correspond to the color associated with cell (C3, L4) in the color map, M, and, in response to the registering step, the logic 100/program in the processor 75 will change the emitted color light, L$_{LED}$, of the LED 56 at step S.109' to that of the color associated with cell (C3, L4) in the color map, M. In some embodiments, the registering step S.108' may be obviated, upon, upon depression of a button, 64$_R$, 64$_G$, the logic 100 may immediately cause the LED 56 to change the emitted color light, L$_{LED}$.

As seen in FIG. 6, the illustrated embodiment of the color map, M, shows six rows of colors and six columns of color levels. Accordingly, when starting from the origin cell, (C1, L1), if, for example, the user, U, were to depress each of the first push button 64$_R$ and the second push button 64$_G$ five times, the logic 100 would register the number of depressions and navigate, for example, diagonally across the color map, M, from the origin cell (C1, L1) and eventually arrive at the cell, (C6, L6). Further, if a user, U, were to depress each of the first push button 64$_R$ and the second push button 64$_G$ one additional time, the logic 100 would, for example, loop back to the origin cell, (C1, L1).

Although the color map, M, of FIG. 6 is only shown to include six columns and six rows with each cell identified with a particular color, the color map, M, is shown for exemplary purposes and is not meant to limit the scope of the invention. Accordingly, the color map, M, may be designed to include any number of columns and rows and colors, as desired, which, as described above, could result in up to 16.8 million different user-selectable colors.

Further, in an embodiment, the user, U, may retain a copy of the color map, M, on his/her person such that the user, U, may determine how many depressions of each push button, 64$_R$, 64$_G$ would be needed to arrive at particular color notated on the color map, M. For example, if the user, U, wanted to arrive at the color, "chocolate," the user, U, could refer to, for example, a paper copy of the color map, M, and notice that "chocolate" is located in the cell (C3, L5); accordingly, the user, U, would know that the first push button 64$_R$ would have to be pushed two times in order to advance from row C1 to row C3 and that the second push button 64$_G$ would have to be pushed four times in order to advance from column L1 to column L5. Upon depressing the push buttons, 64$_R$, 64$_G$ as described above, the logic 100/program would register the number of depressions and cause the red, green and blue components of the LED 56 to be driven in a manner such that the individual red, green and blue outputs are combined to produce "chocolate" colored LED light, L$_{LED}$. Further, the program in the controller 75 may include memory and store therein a previously-selected color (e.g., "chocolate") selected by the user, U, as, for example, a "favorite color," such that upon actuating the LED 56 (i.e., upon "waking up" from sleep mode), the LED 56 may emit the previous, user-selected color, chocolate, rather than defaulting to the origin cell (C1, L1), which relates to the color, magenta.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An apparatus, comprising:
   an assembly including:
   a substantially tubular body having an inner surface and an outer surface, wherein the inner surface forms a first passageway extending through the substantially tubular body;
   a first portion including one or more components disposed within the first passageway and connected to the inner surface, wherein the one or more components of the first portion include
a reticle,
a light-emitting diode, and
a circuit board including a processor having a program, wherein the light-emitting diode is connected to the circuit board, wherein the program controls the light-emitting diode to emit one of at least three user-selectable colored lights upon the reticle; and
a second portion including one or more components arranged upon the outer surface of the substantially tubular body, wherein the one or more components of the second portion includes at least one actuator connected to the circuit board, wherein actuation of the at least one actuator provides an input to the processor to cause the program to control the light-emitting diode, wherein the at least one actuator includes a first actuator and a second actuator, wherein, upon a first, simultaneous depression of both of the first actuator and the second actuator less than a period of time, the program of the processor provides: means for actuating a multi-color mode of operation of the light-emitting diode for causing the one of at least three user-selectable colored lights emitted from the light-emitting diode to be a mixed color light.

2. The apparatus according to claim 1, wherein, upon a first depression of only the first push button less than a period of time, the program of the processor provides: means for actuating a dual color mode of operation of the light-emitting diode for causing the one of at least three user-selectable colored lights emitted from the light-emitting diode to be a red color light derived from a red source of a red-green-blue component of the light-emitting diode such that the reticle reflects the red color and appears to be a red-colored reticle.

3. The apparatus according to claim 2, wherein, upon a second depression of either of the first push button or the second push button longer than the period of time, the program of the processor provides: means for de-actuating the emitted red color light such that the reticle no longer reflects the red color and appears to be a black-colored reticle.

4. The apparatus according to claim 2, wherein, upon a second depression of only the first push button less than the period of time, the program of the processor provides: means for adjusting an intensity level of the emitted red color light.

5. The apparatus according to claim 1, wherein, upon a first depression of only the second push button less than a period of time, the program of the processor provides: means for actuating a dual color mode of operation of the light-emitting diode for causing the one of at least three user-selectable colored lights emitted from the light-emitting diode to be a green color light derived from a green source of a red-green-blue component of the light-emitting diode such that the reticle reflects the green color and appears to be a green-colored reticle.

6. The apparatus according to claim 5, wherein, upon a second depression of either of the first push button or the second push button longer than the period of time, the program of the processor provides: means for de-actuating the emitted green color light such that the reticle no longer reflects the green color and appears to be a black-colored reticle.

7. The apparatus according to claim 5, wherein, upon a second depression of only the second push button less than the period of time, the program of the processor provides: means for adjusting an intensity level of the emitted green color light.

8. The apparatus according to claim 1, wherein the mixed color light is derived from a red source, green source and a blue source of a red-green-blue component of the light-emitting diode such that the reticle reflects the mixed color and appears to be a mixed-colored reticle.

9. The apparatus according to claim 8, wherein, upon a second, depression of either the first actuator or the second actuator longer than the period of time, the program of the processor provides: means for de-actuating the emitted mixed color light such that the reticle no longer reflects the mixed color and appears to be a black-colored reticle.

10. The apparatus according to claim 8, wherein, upon a depression of either of the first actuator or the second actuator less than the period of time, the program of the processor provides: means for changing the emitted mixed color light to a different mixed color light.

11. The apparatus according to claim 1, further comprising: a tube having an inner surface and an outer surface, wherein the inner surface forms a passageway extending through the tube, wherein the tube is connected to the substantially tubular body, wherein the first passageway of the substantially tubular body is aligned with and in communication with the passageway extending through the tube.

12. The apparatus according to claim 11, further comprising: an object piece disposed within the passageway of the tube and connected to the inner surface of the tube; an erector tube disposed within the passageway of the tube and within the first passageway of the substantially tubular body, wherein the erector tube is connected to the inner surface of the tube; and an eye piece disposed within the first passageway and connected to the inner surface of the substantially tubular body, wherein the substantially tubular body is an eye piece housing.

13. The apparatus according to claim 12, further comprising: a plurality of adjustment knobs disposed upon the outer surface of the tube; and a power ring disposed upon the outer surface of the tube.

14. The apparatus according to claim 13, wherein a connection of the tube, the substantially tubular body, the object piece, the erector tube, the eye piece, the plurality of adjustment knobs and the power ring form a scope having a distal end and a proximal end.

15. The apparatus according to claim 12, wherein a proximal end of the erector tube includes a pocket, wherein the reticle is disposed within and connected to the pocket.

16. The apparatus according to claim 15, wherein the reticle is an etched-metal body.

17. The apparatus according to claim 16, wherein the one or more components of the first portion further include: a substantially transparent body, wherein the substantially transparent body is disposed within and connected to the pocket, wherein the etched-metal body reticle is separate from and joined to a surface portion of the substantially transparent body.

18. The apparatus according to claim 15, wherein the one or more components of the first portion further include: a substantially transparent body, wherein the substantially transparent body is disposed within and connected to the pocket, wherein the reticle is formed upon a surface portion of the substantially transparent body.

19. The apparatus according to claim 18, wherein the reticle is substantially opaque and etched into the surface portion of the substantially transparent body, wherein the one or more components of the first portion further include: a light reflector connected to the inner surface of the substantially tubular body, wherein the light reflector provides means for re-directing light from the light-emitting diode that is not directly incident upon the reticle.

20. The scope according to claim 12, wherein a proximal end of the erector tube includes a pocket, wherein the reticle is disposed within and connected to the pocket.

21. The scope according to claim 20, wherein the reticle is an etched-metal body.

22. The scope according to claim 21, wherein the one or more components of the first portion further include: a substantially transparent body, wherein the substantially transparent body is disposed within and connected to the pocket, wherein the etched-metal body reticle is separate from and joined to a surface portion of the substantially transparent body.

23. The scope according to claim 20, wherein the one or more components of the first portion further include: a substantially transparent body, wherein the substantially transparent body is disposed within and connected to the pocket, wherein the reticle is formed upon a surface portion of the substantially transparent body.

24. The scope according to claim 23, wherein the reticle is substantially opaque and etched into the surface portion of the substantially transparent body, wherein the one or more components of the first portion further include: a light reflector connected to the inner surface of the eye piece housing, wherein the light reflector provides means for re-directing light from the light-emitting diode that is not directly incident upon the reticle.

25. The apparatus according to claim 1, wherein the inner surface substantially tubular body forms a second passageway extending through the substantially tubular body, wherein the second passageway is in communication with and substantially perpendicularly arranged with respect to the first passageway.

26. The apparatus according to claim 25, wherein the light-emitting diode arranged substantially within one of or both of the first passageway and the second passageway.

27. The apparatus according to claim 25, wherein the inner surface of the substantially tubular body forms a bezel within the second passageway, wherein the bezel forms a support surface that supports the circuit board.

28. A scope, comprising:
a tube having an inner surface and an outer surface, wherein the inner surface forms a passageway extending through the tube; an eye piece housing having an inner surface and an outer surface, wherein the inner surface forms a first passageway extending through the eye piece housing, wherein the tube is connected to the eye piece housing, wherein the first passageway of the eye piece housing is aligned with and in communication with the passageway extending through the tube; an object piece disposed within the passageway of the tube and connected to the inner surface of the tube; an erector tube disposed within the passageway of the tube and within the first passageway of the eye piece housing, wherein the erector tube is connected to the inner surface of the tube; an eye piece disposed within the first passageway and connected to the inner surface of the eye piece housing; a plurality of adjustment knobs disposed upon the outer surface of the tube; and
a power ring disposed upon the outer surface of the tube; and
an assembly including a first portion including one or more components disposed within the first passageway and connected to the inner surface of the eye piece housing, wherein the one or more components of the first portion include a reticle, a light-emitting diode, and a circuit board including a processor having a program, wherein the light-emitting diode is connected to the circuit board, wherein the program controls the light-emitting diode to emit one of at least three user-selectable colored lights upon the reticle, and a second portion including one or more components arranged upon the outer surface of the eye piece housing, wherein the one or more components of the second portion includes at least one actuator connected to the circuit board, wherein actuation of at least one actuator provides an input to the processor to cause the program to control the light-emitting diode, wherein the at least one actuator includes a first actuator and a second actuator, wherein, upon a first, simultaneous depression of both of the first actuator and the second actuator less than a period of time, the program of the processor provides: means for actuating a multi-color mode of operation of the light-emitting diode for causing the one of at least three user-selectable colored lights emitted from the light-emitting diode to be a mixed color light.

29. The scope according to claim 28, wherein, upon a first depression of only the first push button less than a period of time, the program of the processor provides: means for actuating a dual color mode of operation of the light-emitting diode for causing the one of at least three user-selectable colored lights emitted from the light-emitting diode to be a red color light derived from a red source of a red-green-blue component of the light-emitting diode such that the reticle reflects the red color and appears to be a red-colored reticle.

30. The scope according to claim 29, wherein, upon a second depression of either of the first push button and the second push button longer than the period of time, the program of the processor provides: means for de-actuating the emitted red color light such that the reticle no longer reflects the red color and appears to be a black-colored reticle.

31. The scope according to claim 29, wherein, upon a second depression of only the first push button less than the period of time, the program of the processor provides means for adjusting an intensity level of the emitted red color light.

32. The scope according to claim 28, wherein, upon a first depression of only the second push button less than a period of time, the program of the processor provides: means for actuating a dual color mode of operation of the light-emitting diode for causing the one of at least three user-selectable colored lights emitted from the light-emitting diode to be a green color light derived from a green source of a red-green-blue component of the light-emitting diode such that the reticle reflects the green color and appears to be a green-colored reticle.

33. The scope according to claim 32, wherein, upon a second depression of either of the first push button and the second push button longer than the period of time, the program of the processor provides: means for de-actuating the emitted green color light such that the reticle no longer reflects the green color and appears to be a black-colored reticle.

34. The scope according to claim 32, wherein, upon a second depression of only the second push button less than the period of time, the program of the processor provides: means for adjusting an intensity level of the emitted green color light.

35. The scope according to claim 28, wherein the mixed color light is derived from a red source, green source and a blue source of a red-green-blue component of the light-emitting diode such that the reticle reflects the mixed color and appears to be a mixed-colored reticle.

36. The scope according to claim 35, wherein, upon a second depression of either of the first actuator or the second actuator longer than the period of time, the program of the processor provides: means for de-actuating the emitted mixed color light such that the reticle no longer reflects the mixed color and appears to be a black-colored reticle.

37. The scope according to claim 35, wherein, upon a depression of either of the first actuator or the second actuator less than the period of time, the program of the processor provides: means for changing the emitted mixed color light to a different mixed color light.

38. The scope according to claim 28, wherein the inner surface eye piece housing forms a second passageway extending through the eye piece housing, wherein the second passageway is in communication with and substantially perpendicularly arranged with respect to the first passageway.

39. The scope according to claim 38, wherein the light-emitting diode arranged substantially within one of or both of the first passageway and the second passageway.

40. The scope according to claim 38, wherein the inner surface of the eye piece housing forms a bezel within the second passageway, wherein the bezel forms a support surface that supports the circuit board.

41. A method, comprising the steps of:
providing an assembly including at least:
a reticle,
at least one actuator,
a light-emitting diode and
a circuit board including a processor having a program;
actuating the at least one actuator for providing one or more input signals to the program in the processor; and
responsive to the input signal, utilizing the program to control the light-emitting diode for emitting one of at least three user-selectable colored lights toward the reticle, wherein the providing the assembly step includes providing a first actuator and a second actuator for defining the at least one actuator, wherein the actuating step includes: upon firstly simultaneously depressing both of the first actuator and the second actuator less than a period of time, the program of the processor permits actuating a multi-color mode of operation of the light-emitting diode for causing the one of at least three user-selectable colored lights emitted from the light-emitting diode to be a mixed color light.

42. The method according to claim 41, wherein the actuating step includes: upon firstly depressing only the first push button less than a period of time, the program of the processor permits actuating a dual color mode of operation of the light-emitting diode for causing the one of at least three user-selectable colored lights emitted from the light-emitting diode to be a red color light derived from a red source of a red-green-blue component of the light-emitting diode such that the reticle reflects the red color and appears to be a red-colored reticle.

43. The method according to claim 42, wherein the actuating step includes: upon secondly depressing either of the first push button and the second push button longer than the period of time, the program of the processor permits de-actuating the emitted red color light for causing the reticle to no longer reflect the red color for causing the reticle to appear as a black-colored reticle.

44. The method according to claim 42, wherein the actuating step includes: upon secondly depressing only the first push button less than the period of time, the program of the processor permits adjusting an intensity level of the emitted red color light.

45. The method according to claim 41, wherein, the actuating step includes upon firstly depressing only the second push button less than a period of time, the program of the processor permits actuating a dual color mode of operation of the light-emitting diode for causing the one of at least three user-selectable colored lights emitted from the light-emitting diode to be a green color light derived from a green source of a red-green-blue component of the light-emitting diode such that the reticle reflects the green color and appears to be a green-colored reticle.

46. The method according to claim 45, wherein the actuating step includes: upon secondly depressing either of the first push button and the second push button longer than the period of time, the program of the processor permits de-actuating the emitted green color light for causing the reticle to no longer reflect the green color for causing the reticle to appear as a black-colored reticle.

47. The method according to claim 45, wherein the actuating step includes: upon secondly depressing only the second push button less than the period of time, the program of the processor permits adjusting an intensity level of the emitted green color light.

48. The method according to claim 41, wherein the mixed color light is derived from a red source, green source and a blue source of a red-green-blue component of the light-emitting diode such that the reticle reflects the mixed color and appears to be a mixed-colored reticle.

49. The method according to claim 48, wherein the actuating step includes: upon secondly simultaneously depressing either of the first actuator or the second actuator longer than the period of time, the program of the processor permits de-actuating the emitted mixed color light for causing the reticle to no longer reflect the mixed color for causing the reticle to appear as a black-colored reticle.

50. The method according to claim 48, wherein the actuating step includes: upon depressing either of the first actuator or the second actuator less than the period of time, the program of the processor permits changing the emitted mixed color light to a different mixed color light for causing the reticle to reflect the different mixed color for causing the reticle to appears as a different color mixed-colored reticle.

51. The method according to claim 41, wherein the providing the assembly step includes providing a tube having an inner surface and an outer surface, wherein the inner surface forms a passageway extending through the tube, wherein the tube is connected to a substantially tubular body that includes the reticle, the least one actuator, the light-emitting diode and the circuit board including the processor having the program, wherein a first passageway of the substantially tubular body is aligned with and in communication with the passageway extending through the tube.

52. The method according to claim 51, wherein the providing the assembly step includes providing an object piece disposed within the passageway of the tube and connected to the inner surface of the tube, an erector tube disposed within the passageway of the tube and within the first passageway of the substantially tubular body, wherein the erector tube is connected to the inner surface of the tube, wherein the providing the assembly step includes further providing an eye piece disposed within the first passageway and connected to the inner surface of the substantially tubular body, wherein the substantially tubular body is an eye piece housing.

53. The method according to claim 52, wherein the providing the assembly step includes providing a plurality of adjustment knobs disposed upon the outer surface of the tube, and a power ring disposed upon the outer surface of the tube.

54. The method according to claim 53, further comprising the step of: connecting the tube, the substantially tubular body, the object piece, the erector tube, the eye piece, the plurality of adjustment knobs and the power ring for forming a scope.

* * * * *